(12) United States Patent
Plewa et al.

(10) Patent No.: US 11,392,360 B2
(45) Date of Patent: Jul. 19, 2022

(54) SYSTEMS AND METHODS FOR REDEPLOYING SOURCE CODE BUILDS

(71) Applicants: Atlassian Pty Ltd., Sydney (AU); Atlassian Inc., San Francisco, CA (US)

(72) Inventors: Piotr Plewa, Sydney (AU); Samuel Tannous, Sydney (AU); Geoff Crain, Sydney (AU); Jonathan Lowe, Sydney (AU); Aneita Yang, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/129,416

(22) Filed: Dec. 21, 2020

(65) Prior Publication Data
US 2022/0197621 A1 Jun. 23, 2022

(51) Int. Cl.
*G06F 8/60* (2018.01)
*G06F 8/71* (2018.01)
*G06F 3/0482* (2013.01)

(52) U.S. Cl.
CPC .................. *G06F 8/60* (2013.01); *G06F 8/71* (2013.01); *G06F 3/0482* (2013.01)

(58) Field of Classification Search
CPC ............. G06F 8/60; G06F 8/71; G06F 3/0482
See application file for complete search history.

(56) References Cited

U.S. PATENT DOCUMENTS

| 9,229,740 | B1 * | 1/2016 | Allen ....................... G06F 9/445 |
| 10,817,283 | B1 * | 10/2020 | Naik ..................... G06Q 10/103 |
| 10,979,440 | B1 * | 4/2021 | Kalika ..................... G06F 21/51 |
| 2006/0130054 | A1 * | 6/2006 | Bocking .................... G06F 8/61 717/173 |
| 2012/0144248 | A1 * | 6/2012 | Bull ..................... G06F 11/3664 714/48 |
| 2014/0130036 | A1 * | 5/2014 | Gurikar ..................... G06F 8/61 717/176 |
| 2018/0004736 | A1 * | 1/2018 | Zhao ......................... H04B 1/38 |
| 2018/0270124 | A1 * | 9/2018 | Chugtu .................... G06F 9/541 |
| 2019/0163469 | A1 * | 5/2019 | Sreenivasa .......... H04L 63/0281 |
| 2019/0179662 | A1 * | 6/2019 | Chen .......................... G06F 9/48 |
| 2020/0192662 | A1 * | 6/2020 | Hu ........................... G06F 8/427 |

* cited by examiner

*Primary Examiner* — Daxin Wu
(74) *Attorney, Agent, or Firm* — Brownstein Hyatt Farber Schreck, LLP

(57) ABSTRACT

Systems and methods for redeploying source code are disclosed. The method includes receiving a request for previewing redeployment of a selected source code deployment in a target environment. The request includes an identifier of the selected source code deployment and an identifier of the target environment. In addition, the method includes identifying a source code revision identifier of the selected source code deployment, and identifying a source code revision identifier of the latest source code deployment in the target environment. Based on this information, the method retrieves a list of source code revisions between the selected deployment and the latest deployment in the target environment. The retrieving is based on the source code revision identifiers of the selected source code deployment and the latest source code deployment. The method forwards the retrieved list of source code revisions to a client device for rendering on a display of the client device.

20 Claims, 10 Drawing Sheets

400

Environments

Test 318

333  12 MIN AGO
7778e48 Adding pipelines.yml to build and push mock services

Staging 320

302  23 MIN AGO
7778e48 Adding pipelines.yml to build and push mock services

Production 322

301  9 Sep 2020
7778e48 Adding pipelines.yml to build and push mock services

Test environment history 402

✓ #338  ...
7778e48 Adding pipelines.yml to build ...
JUST NOW

✓ #337  ...
7778e48 Added bitbucketci-java-client ...
2 MIN AGO

✓ #336  ...
7778e48 Adding pipelines.yml to  Redeploy  — 404
6 MIN AGO

✓ #335  ...
7778e48 Adding pipelines.yml to build ...
1 HR AGO

✓ #334  ...
7778e48 Adding pipelines.yml to build ...
3 HR AGO

✓ #333  ...
7778e48 Adding pipelines.yml to build ...
9 SEP 2020

*Fig. 4*

SYSTEMS AND METHODS FOR REDEPLOYING SOURCE CODE BUILDS

TECHNICAL FIELD

Aspects of the present disclosure are directed to source code deployments, and in particular to redeploying source code builds in continuous integration systems.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Continuous integration (CI) is a software development practice that requires software developers to periodically integrate source code into a shared repository. The shared repository is usually managed by a source code management (SCM) system (also called a revision control or version control system) that tracks and manages source code as it is written and revised. The revisions (also called "commits" in Git) added to the SCM system can be automatically deployed by a CI management system into one or more environments, such as a testing environment (where the source code is tested to ensure it runs), a staging environment (where behavior of the source code is tested with realistic data) and/or a production environment (also known as a live environment as users directly interact with the source code in this environment).

It will be appreciated that each source code repository typically include hundreds if not thousands of commits that are constantly being updated and deployed and it is often difficult to track the commits the environments in which they have been successfully deployed.

SUMMARY

According to some embodiments of the present disclosure, a computer-implemented method is disclosed. The method includes receiving, from a client device, a request for previewing redeployment of a selected source code deployment in a target environment. The request can include an identifier of the selected source code deployment and an identifier of the target environment. The method further includes identifying a source code revision identifier of the selected source code deployment and identifying a source code revision identifier of the latest source code deployment in the target environment. In addition, the method includes retrieving a list of source code revisions between the selected source code deployment and the latest source code deployment in the target environment. The retrieving is done based on the source code revision identifiers of the selected source code deployment and the latest source code deployment. The method also includes forwarding the retrieved list of source code revisions to the client device for rendering on a display of the client device.

According to some other embodiments of the present disclosure, a computer system is disclosed. The computer system includes a processor and non-transitory memory. The non-transitory memory includes instructions, which when executed by the processor cause the computer system to perform a number of steps including receiving, from a client device, a request for previewing redeployment of a selected source code deployment in a target environment. The request includes an identifier of the selected source code deployment and an identifier of the target environment. In addition, the steps include identifying a source code revision identifier of the selected source code deployment and identifying a source code revision identifier of the latest source code deployment in the target environment. The steps also include retrieving a list of source code revisions between the selected source code deployment and the latest source code deployment in the target environment. The retrieving may be done based on the source code revision identifiers of the selected source code deployment and latest source code deployment. Further, the steps include forwarding the retrieved list of source code revisions to the client device for rendering on a display of the client device.

BRIEF DESCRIPTION OF THE DRAWINGS

FIG. 4 is another example deployment history user interface for a particular environment.

Figure 1:
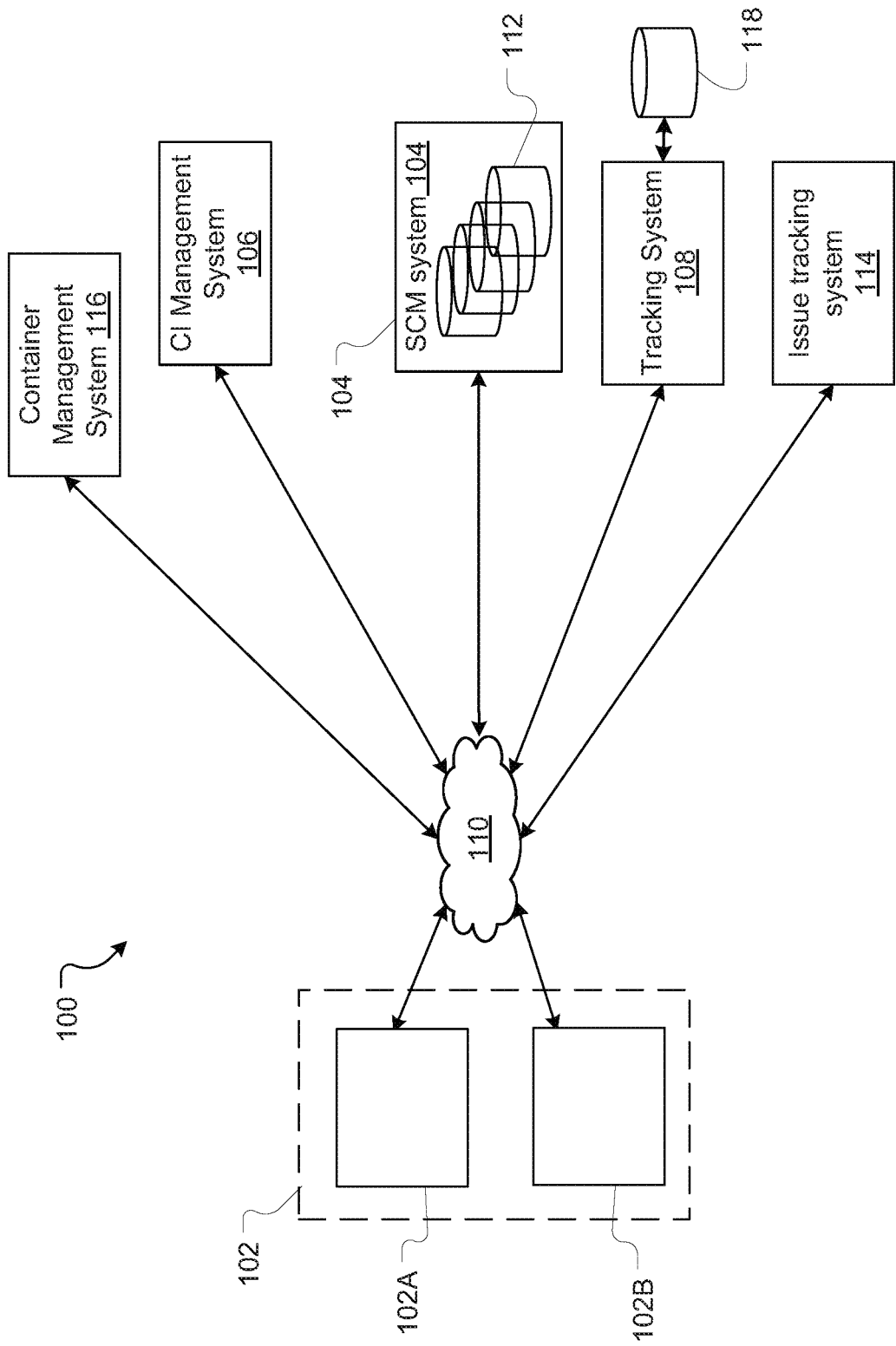
FIG. 1 is a block diagram illustrating a network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

In the description below, Git (and Bitbucket® offered by Atlassian, Inc.) are used as an example SCM system for illustrative purposes. Git is a version control system used for software development and other version control tasks. A Git working directory is a repository that has complete history and revision tracking metadata and functions. It will be appreciated that the various feature and techniques described herein could, with appropriate modifications, be used with alternative SCM systems (e.g., Mercurial® and Subversion®).

Further, one example CI management system in which features of the present disclosure may be implemented is Bitbucket Pipelines, which is commercially available from Atlassian. Bitbucket Pipelines is integrated with Bitbucket (Atlassian's SCM system). In the description below, Bitbucket Pipelines is used as an example CI management system and Bitbucket is used as an example SCM system for illustrative purposes. It will be appreciated that the various feature and techniques described herein could, with appropriate modifications, be used with alternative CI management systems and SCM systems (e.g., TravisCl, Wercker, Buildkite, Bamboo, and Jenkins)

Source code typically progresses through four stages—development, testing, staging and production. As the name suggests, in the development stage, the source code is developed and often pushed to an SCM system. Generally speaking, developers work on the source code locally, often updating it multiple times before pushing the latest updated version of the source code to the SCM system. Each source code update is called a 'commit' in Git.

Once the latest source code commit is pushed to the SCM system, it typically passes to the testing stage (either automatically in the case of CI or manually) where various tests are run on the source code to ferret out any errors or bugs in the source code. Typically, the source code is tested in all the environments (e.g., operating systems, programs, devices) it will ultimately be deployed in. Upon passing the testing phase, the source code revision enters the staging process—where the behavior of the source code is tested with realistic data. When the source code passes all these stages, it enters the production stage, also known as the live stage, where customers can interact directly with the source code.

As noted previously, continuous integration (CI) is the practice of merging working copies of source code from multiple software developers into a shared repository periodically and then using a CI management system to automatically test and/or deploy the updated source code in one or more deployment environments that correspond to three of the software development stages—testing, staging and production.

Developers often utilize CI/CD pipelines to automate this process. Generally speaking, a CI/CD pipeline automates software delivery process—in essence, it builds committed code, and then deploys the code in different environment in a staged fashion. When source code is successfully deployed in one environment, it can be automatically or manually deployed to the next environment. Developers create an initial pipeline deployment script/descriptor, which is used by the CI/CD system to deploy the source code in various different environments.

In complex and/or large computer applications, the source code is continuously being developed and updated to add new features or correct previously offered features where errors were detected. Accordingly, at any given time, hundreds if not thousands of source code revisions may be deployed in pipelines, making it is difficult for developers to know/remember which source code revision is currently in which stage of software development.

To address one or more of the above-mentioned deficiencies associated with conventional CI management, co-pending U.S. patent application Ser. No. 16/457,451, titled "Systems and Methods for tracking source code deployments" discloses systems and methods for creating source code deployment pipelines and tracking source code deployments in the pipelines. In particular, the systems and methods disclosed therein were configured to track deployment history for each environment. Furthermore, the systems and methods were configured to generate dashboards and/or user interfaces allowing developers to review deployment history they may be interested in, promote source code from one environment to another, and view further information about each deployment.

Further still, for each deployment, U.S. patent application Ser. No. 16/457,451 discloses systems and methods for retrieving and rendering corresponding information from external systems, such as issue tracking systems, to supplement the existing deployment information. For example, the system may retrieve and render a list of issues (e.g., bugs and their fixes maintained by an issue tracking system such as Ere). U.S. patent application Ser. No. 16/457,451 is incorporated herein in its entirety.

Such CI/CD pipelines and deployment tracking systems enable developers to keep a track of source code deployments. In some cases, however, a developer may deploy a particular source code revision to one or more environments before realizing that there was a bug in the source code, an error in the deployment script, or an error in the environment, because of which the source code did not deploy correctly in a particular environment. In such cases it is often desirable to roll back the deployment to a previous version, for example, a version of the source code that did not have the bug or re-run the deployment once the deployment script is corrected.

Conventionally, if bugs were discovered in the source code once it had been deployed, developers would need to fix the bug and create/commence a new build pipeline with a new version of the source code (that is bug free), which usually takes a long time. Alternatively, developers could revert the changes made to the source code (which introduced the bug) and again commence a new build pipeline with the reverted source code. In another technique, a new pipeline could be created with a previous source code revision identifier.

In all three previously known techniques, a new build pipeline needs to be created and commenced from the beginning, which can be time consuming. Further, because a new pipeline is created, the deployment artifacts (i.e., the artefacts generated at each deployment stage/step) also need to be rebuilt. Artifacts are files that are produced by a particular deployment step, such as reports, clean copies of the source code, and/or result files that are to be shared with the next step in the build configuration. Rebuilding artifacts reduces confidence in the rollback as rebuilding can produce a different artifact to the one previously produced, e.g., due to dependency version changes.

Aspects of the present disclosure provide a system and method to rollback a failed deployment step within a build pipeline without creating/commencing a new build pipeline. In particular, aspects of the present disclosure allow users to redeploy a previous source code revision in a particular environment without the need to restart the entire build pipeline or create a new build pipeline. In this manner, previously created artifacts can be reused. This considerably reduces the time taken to fix a broken environment and increases the reliability in the rollback.

As used in this disclosure, a build refers to a pipeline including multiple steps or deployments, whereas a deployment refers to a particular step of the build that is executed in a particular environment.

FIG. 1 illustrates a networked infrastructure 100 in which aspects of the present disclosure are implemented. The infrastructure 100 includes one or more client devices 102, a source code management (SCM) system 104, a CI management system 106, and a tracking system 108. In some embodiments, the networked infrastructure 100 may further include one or more external systems that include information pertaining to source code. An example of such an external system is an issue tracking system (ITS) 114 (depicted in FIG. 1). The client devices 102, SCM system 104, CI management system 106, tracking system 108 and issue tracking system 114 communicate with each other over one or more communication networks 110.

Generally, the systems depicted in FIG. 1 communicate with each other to update source code, deploy source code updates or redeploy source code, track these deployments and render dashboards displaying information about deployments/redeployments of interest to users.

In particular, the SCM system 104 stores source code repositories 112 (hereinafter referred to as repositories 112) and manages their content. It also receives/responds to requests from client devices 102 and the CI management system 106 to retrieve/store data in the repositories 112. For example, the SCM system 104 may notify the CI management system 106 when a user commits/pushes an update to source code in a repository 112. In addition, the SCM system 104 may receive a request from the CI management system 106 to access source code from a repository 112 that has recently been updated. The SCM system 104, in response, may retrieve the requested source code and forward it to the CI management system 106.

The repositories 112 may include multiple versions of source code files and associated metadata. Often a particular repository may store source code files corresponding to a particular software application and/or software development team. Typically, the SCM system 104 stores and manages multiple repositories; however, not all repositories may be registered for CI (i.e., to have their source code verified when source code is updated/revised).

To differentiate the repositories registered for CI from the rest of the repositories, in one embodiment, the metadata associated with a repository includes an indicator indicating whether CI is enabled or not. The metadata of CI enabled repositories may also include a deployment descriptor, which includes, among other things, the steps for performing builds/executing deployments on the source code in different environments, and identifiers of the environments in which the source code is supposed to be built. The CI management system 106 (as described in detail below) may be configured to determine whether CI is required for a repository by inspecting the CI indicator in the metadata and, if such an indicator is present, retrieve the associated deployment descriptor.

The client devices 102 are configured to communicate with the SCM system 104, the CI management system 106, and the tracking system 108. To that end, in certain embodiments, the client devices 102 include various installed applications such as an SCM client (not shown), a CI client (not shown) and/or a tracking client (not shown).

The SCM client may be configured to create local working copies of source code; modify the working copies; commit/push changes made in the working copies to the SCM system 104 (so that the changes are written to the relevant repository 112); fetch (e.g. pull) files from a repository 112 the developer has access to; provide a user interface for reading/writing source code and deployment descriptor.

The CI client may be configured to allow communication between the client device 102 and the CI management system 106. For example, it may allow a developer to register an SCM repository 112 for CI with the CI management system 106.

The tracking client may be utilized to, for example, view/track history of source code deployments (or pipelines) executed by the CI management system 106, promote specific source code revisions in a pipeline from one environment to another, redeploy source code in a particular environment, view summary of source code revisions along with any issues associated with that particular revision, etc.

In certain embodiments, instead of one or more of these dedicated clients, the client device 102 simply includes a web browser client that communicates with the SCM system 104, the CI management system 106, and/or the tracking system 108 via the web browser client.

Only two client devices (102A and 102B) have been illustrated, but normal operation typically involves many more client devices connected to the various other systems in FIG. 1.

The client devices 102 may communicate with the other systems in infrastructure 100 via suitable communication networks 110. For example, the client devices 102 may communicate with the SCM system 104 via private or public networks, and with the CI management system 106 and the tracking system 108 via public networks. It will be appreciated that based on the required implementation, any suitable communication network 110 may be utilized to allow communication between the systems in environment 100.

As described in detail below, the CI management system 106 manages builds and deployments. Specifically, the CI management system 106 detects whether source code in a repository 112 that is registered for continuous integration is updated, retrieves the corresponding deployment descriptor from the repository 112, initializes one or more containers to retrieve the updated source code from the repository 112 and deploys the updated source code based on the deployment descriptor. The CI management system 106 also releases the containers once the deployment is complete.

To deploy source code in various environments, the CI management system 106 utilizes one or more computing resources. In some embodiments, the CI management system 106 communicates with a container management system (such as Amazon Web Services EC2 Container Services, Google Kubernetes, etc.) 116 to provision one or more computing resources to perform the builds. Alternatively, the CI management system 106 utilizes dedicated on-premises computing resources (not shown) operatively connected to the CI management system 106.

A container management system 116 may be utilized when the CI management system 106 services a large number of clients or software development teams, constantly updating the source code they are working on. Physical on-premises devices may be utilized for lower volumes—i.e., when the CI management system 106 services a small number of clients or software development teams that update their source code infrequently.

The tracking system 108 receives/retrieves information related to source code deployments from the CI management system 106 and stores this information in a database, such as in the deployment database 118 shown in FIG. 1. Further, it is configured to forward this information to client devices 102 as and when deployment information is requested by developers and other interested parties, such as project managers, IT support, etc. The information may be communicated to the interested parties via any known communication means such as email, SMS, instant message. Alternatively, the information is made accessible on a web server, which the interested parties can access through dedicated clients or web browsers on their client devices 102.

In addition, the tracking system 108 is configured to receive user inputs from the tracking clients to rollback a deployment in a particular environment, instruct the CI management system to perform the rollback, receive information related to the rolled back deployment (or also referred to as a redeployment in this disclosure), and forward the redeployment information to the client devices 102 as and when redeployment information is requested.

The issue tracking system (ITS) 114 manages work items or "issues". Example ITSs include Jira and Jira Service Desk, which are commercially available from Atlassian. When implemented in a software development scenario, the work items managed by the ITS may be bugs, fixes, current software features under development, and/or features intended for further development. Accordingly, users may utilize the ITS 114 to identify one or more bugs in a particular source code revision, recommend possible solutions to identified bugs, recommend features for new versions of a source code, etc.

In order to create and progress issues in the ITS 114 users interact with appropriate user interfaces provided (e.g., by an ITS client not shown in FIG. 1). For example, a user may create a new issue and provide relevant information in respect of the issue (e.g. the unique identifier of the source code revision the issue is associated with, a description of the issue, a priority, and any other relevant information catered for). The ITS 114 itself typically generates an issue key that can be used to uniquely identify the issue, which may be hidden from or visible to the user. Once an issue has been created, a user can interact with it, for example by adding additional information to the issue (e.g. in an issue description or other field), changing the state of the issue (e.g. from in progress to resolved), assigning the issue to another person (e.g. by changing an assigned person field).

In certain embodiments, the tracking system 108 is configured to communicate with the ITS 114 to retrieve issues related to the source code deployments managed by the CI management system 106. Thereafter, the tracking system 108 may store this information in the deployment database 118 and/or communicate as a summary of issues along with deployment summary for display on a client device 102.

In FIG. 1 the SCM system 104, CI management system 106, tracking system 108, and ITS system 114 have been depicted as separate systems communicating over one or more networks 110. These systems (or their functionality) may, however, be divided over any number of physical systems communicating in any appropriate manner By way of example, the functionality of the CI management system 106 and the tracking system 108 may be combined and hosted as a single system.

Figure 2:
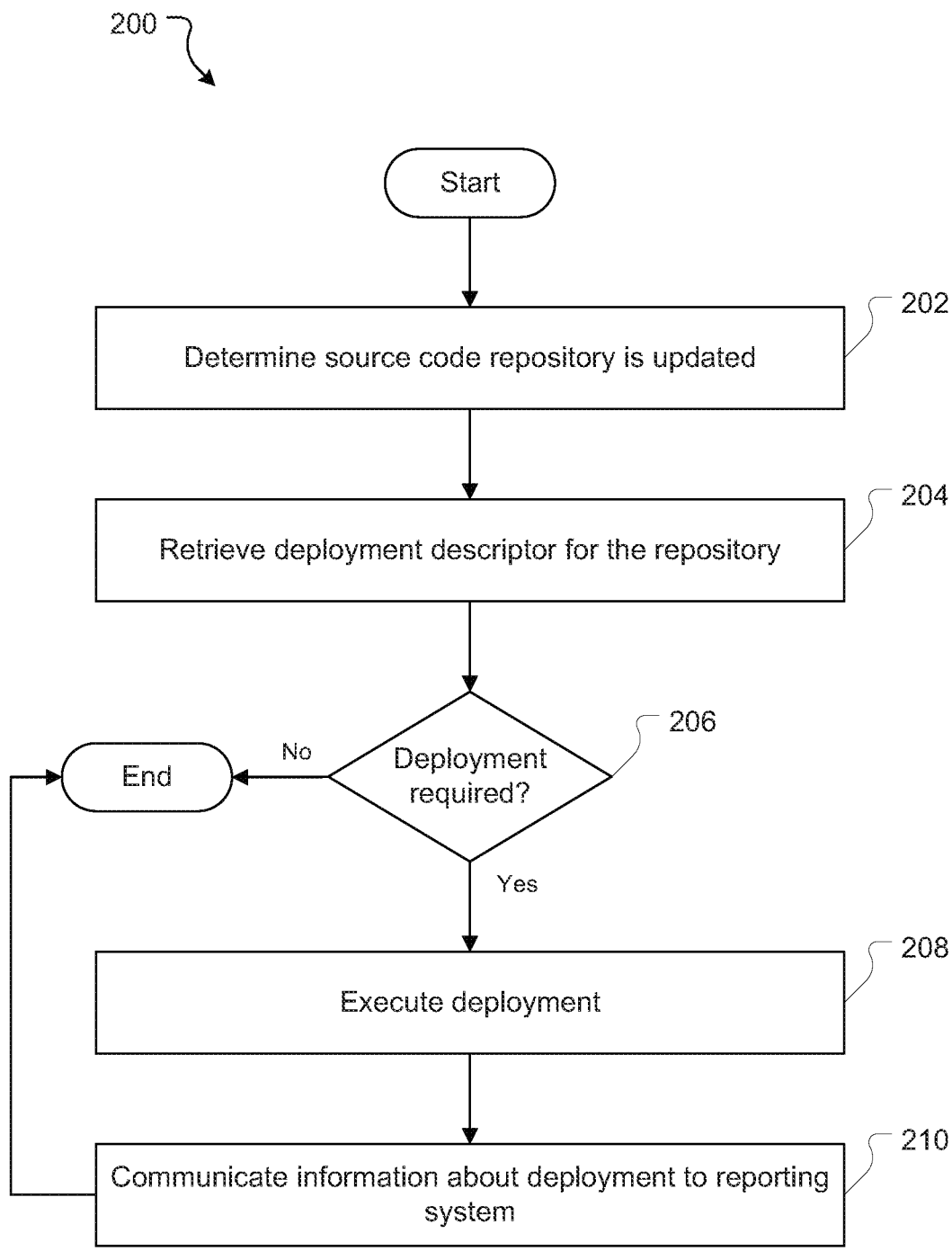
FIG. 2 is a flowchart illustrating an example method for deploying source code revisions according to some aspects of the present disclosure.

FIG. 2 is a flowchart illustrating an example method 200 for deploying source code revisions in different environments using one or more of the systems described with reference to FIG. 1. This method is described with respect to a single source code deployment. However, it will be appreciated that in actual implementation, the method is scaled to multiple deployments.

At step 202, the CI management system 106 determines that a source code repository maintained by the SCM system 104 has been updated. In certain embodiments, the CI management system 106 polls the SCM system 104 at regular intervals (e.g., every 10 minutes) to identify repositories that have been updated in that interval. In other embodiments, the CI management system 106 automatically receives source code update notifications from the SCM system 104 when a repository is updated, e.g., because a user has pushed a new source code revision to the repository or has manually requested that a particular source code revision be deployed.

A notification, polled for or automatically received, may be communicated as an event descriptor to the CI management system 106. The event descriptor includes information about the repository 112 where the change originated (e.g., a repository ID, a repository name, a repository type, and/or a repository URL), a unique identifier for the source code revision (commonly referred to as a commit ID), a list of changes made to the source code between the previous update and this update, and the names of author(s) and/or user(s) that made the changes.

In SCM systems, branching is a technique whereby developers can diverge from the main line of source code development and continue to update source code without affecting the source code in the main line/branch (often called master in Git-based systems). When a source code update is pushed/committed to a branch, the event descriptor also includes an identifier for the branch on which the source code was pushed.

An example event descriptor is illustrated in Table A below. Although a table has been used to illustrate information received in the event descriptor, the relevant information need not be received in a table and could be received in any appropriate format (e.g. a simple text file, a JSON file, an XML file).

TABLE A

Example event descriptor

| | |
|---|---|
| Repository ID | 347abcef38764 |
| Repository Name | John_Doe/bamboo-bootcamp |
| Repository URL | https://api.bitbucketorg/2.0/repositories/John_Doe/bamboo-bootcamp |
| Author | John_Doe |
| Branch | Master |
| CommitID | 7a273a067efbf16ec83d885ad79a7a626f2eec3f |
| Changes | { <br>   "forced": false, <br>   "old": { <br>     "links": { <br>       "commits": { <br>         "href": "https://api.bitbucketorg/2.0/repositories/Jdoe/demo2/commits/master" <br>       }, <br>       "self": { <br>         "href": "https://api.bitbucketorg/2.0/repositories/Jdoe/demo2/refs/branches/master" <br>       }, <br>       "html": { <br>         "href": "https://bitbucketorg/Jdoe/demo2/branch/master" <br>       } <br>     }, <br>     "type": "branch", <br>     "target": { <br>       "hash": "3c62dce565729e8dda3651557d86be6380a03445", <br>       "links": { <br>         "self": { <br>           "href": "https://api.bitbucket.org/2.0/repositories/Jdoe/demo2/commit/3c62dce565729e8dda3651557d86be6380a03445" <br>         }, <br>         "html": { <br>           "href": "https://bitbucketorg/Jdoe/demo2/commits/3c62dce565729e8dda3651557d86be6380a03445" <br>         } <br>     }, |

TABLE A-continued

Example event descriptor

```
    "author": {
        "raw": "John Doe",
        "user": {
            "username": "Jdoe23",
            "type": "user",
            "uuid": "{39846whedwqh49873}",
        }
    }
},
```

In certain embodiments, the SCM system 104 communicates the event descriptor via a webhook—an HTTP POST callback that creates and passes the event descriptor to the CI management system 106 when a corresponding repository is updated. For this to work, webhooks are created for the repositories 112 registered for CI.

Once an event descriptor that corresponds to a repository for which CI is required is received, the CI management system 106 retrieves the deployment descriptor for the repository at step 204. In certain embodiments, the deployment descriptor may be stored in the SCM repository 112 along with the source code, whereas in other embodiments, the deployment descriptor may be stored in the CI management system 106. Accordingly, depending on the particular embodiment, the CI management system 106 retrieves the deployment descriptor from the corresponding SCM repository 112 or from memory associated with the CI management system 106.

Generally speaking, the deployment descriptor corresponding to a particular repository includes instructions for deploying source code revisions from that repository 112 in one or more environments. Further, in some cases, the deployment descriptor may include different sets of deployment instructions for different source code branches. For example, if a repository includes a master branch and a testing branch, the deployment descriptor may include one set of instructions for deploying source code revisions committed to the master branch and another set of instructions for deploying source code revisions committed to the testing branch.

Further still, the deployment descriptor may include a different set of instructions for deploying source code revisions that are manually selected by a developer for a custom deployment.

It will be appreciated that these are merely examples and that in some cases the deployment descriptor may include a single set of instructions for deploying source code revisions committed/pushed on any branch and/or manually selected.

A set of deployment instructions may include the name of one or more repository branches for testing and steps for executing the deployment for each branch. The steps include commands for executing the deployment and settings of a container in which the source code is supposed to be deployed.

In addition, for each step, the deployment descriptor may include a step name, a container image of the container required for the deployment, a trigger, a deployment environment, a script, and/or an artifact. Table B illustrates an example deployment descriptor.

TABLE B

Deployment descriptor

| Build configuration | Default |
|---|---|

| Step 1 | |
|---|---|
| Name: | Build and test |
| Image: | node: 8.5.0 |
| deployment | testing |
| Script: | npm install |
| | npm test |
| | npm build |
| Artifacts | "dist/**" |

| Step 2 | |
|---|---|
| Name: | Deploy to staging |
| Image: | Python:3.5.1 |
| Deployment: | staging |
| Trigger: | manual |
| Script: | python deploy.py staging |

| Step 3 | |
|---|---|
| Name: | Deploy to production |
| Image: | Python:3.5.1 |
| Trigger: | manual |
| Deployment: | production |
| Script: | python deploy.py prod |

In the above example, the deployment descriptor includes the following information:

A deployment configuration. In this example, the deployment configuration is 'default' which means that the steps for this configuration are executed for all commits (or source code revisions pushed to the SCM system 104) for that repository, unless the commit is for a particular branch or is manually selected. In other examples, the build configuration may point to a particular 'branch', in which case the steps are executed when a source code revision is committed to the defined branch. Alternatively, this field could be 'custom', in which case the steps are executed when a source code revision is manually selected for deployment (e.g., via the web interface).

Steps, which define the commands executed and settings of containers in which the source code is to be built. Each step in the deployment descriptor may correspond to a particular step in the deployment pipeline. Each step may further include the following fields:

Name, which defines what the step is doing. This field is usually displayed by the tracking system 108 and therefore is usually something that developers can easily understand.

Image: this specifies the container image (e.g., Docker image) to be used for executing a particular step. If an image is not specified, a default image may be used.

Trigger: this specifies whether a particular step is manual or automatic—i.e., whether the CI management system 106 should automatically run the step or wait for approval.

Deployment: defines the type of environment for the deployment (e.g., testing, staging or production).

Script: this field contains a list of commands that are executed to perform the build.

Artifacts: this field defines files that are produced by a particular step, such as reports, clean copies of the source code, and/or result files that are to be shared with the next step in the build configuration.

Although the deployment descriptor is illustrated in a table, the relevant information need not be stored in a table and could be stored in any appropriate format (e.g. a text file such as YAML file).

To retrieve data, such as the deployment descriptor and source code, from the SCM repository 104, the CI management system 106 may negotiate permissions with the SCM system 104. For example, when a user first registers their repository for CI, the user authorizes the CI management system 106 to retrieve information such as source code and deployment descriptor from the SCM repository without the need for explicit permissions when the CI management system 106 requires this information. This authorization may be done using any commonly known authorization/permissions techniques or standards, such as OAuth.

According to the OAuth standard, the CI enabled repositories 112 share secrets with the CI management system 106. Based on these secrets, the CI management system 106 generates authorization tokens when it executes a deployment for a repository. The tokens may be valid for the deployment duration and may expire once the deployment is complete.

Thus, using an authorization token, the CI management system 106 can access the SCM repository 112 identified in the event descriptor and retrieve the deployment descriptor.

In some embodiments, the deployment descriptor is temporarily stored in the CI management system 106 to be utilized during the deployment. Once the deployment is completed, the deployment descriptor is discarded. Alternatively, they are stored in the CI management system 106 for future deployments.

Returning to FIG. 2, at step 206, the CI management system 106 determines whether deployment is required. To this end, the CI management system 106 compares the source code revision information provided in the event descriptor with the build configuration information in the deployment descriptor. In particular, it may compare the identifier of the branch onto which the source code revision was pushed with the build configuration field in the deployment descriptor.

If the comparison results in a negative—e.g., if the branch identifier in the event descriptor does not match the branch identifier in the deployment descriptor or there is no default build configuration in the deployment descriptor, the CI management system 106 may determine that there is no need for deployment and the method 200 ends.

Alternatively, if the comparison results in a positive—e.g., if the branch identifier in the event descriptor matches the branch identifier in the deployment descriptor or there is a default build configuration in the deployment descriptor, the CI management system 106 may determine that the source code revision needs to be deployed and the method 200 proceeds to step 208 where the CI management system 106 executes one or more steps in the deployment descriptor.

In order to execute the deployment, the CI management system 106 generates a deployment request. The deployment request may be created based on the event descriptor and deployment descriptor. Largely, the deployment request includes an identifier that uniquely identifies the current deployment, authorization tokens for accessing a repository (i.e., the repository identified in the event descriptor), and a field indicating the deployment environment (e.g., testing, staging or production). The deployment request may further include a repository identifier, an image identifier, and a commit identifier. In some embodiments, the deployment request may further include a field indicating the steps that are to be performed during the deployment.

Table C illustrates an example deployment request below. Although a table has been used to illustrate this information, the relevant information need not be stored in a table and could be stored in any appropriate format (e.g. a simple text file, a JSON file, an XML file, etc.).

TABLE C

| deployment request | |
|---|---|
| Deployment ID | 8374 |
| Auth-token | fd4jw4908343943 |
| Deployment | Staging |
| Repository ID | 347abcef38764 |
| Commit ID | fd78cd23 |
| Image | Node: 8.5.0 |
| Script | Python deply.py staging |

In the above example, the deployment request includes the following information:

A unique deployment ID associated with that deployment request.

An Auth-token for accessing the repository in which the source code revision is stored.

The environment to which the deployment is being made ('Deployment')

Repository identifier of the repository where the source code revision is stored.

The Commit ID of the commit that was pushed or manually selected for which the deployment is to be executed Build steps ('Script') retrieved from the deployment descriptor that include the commands for executing that particular deployment step.

The CI system 106 retrieves some of the required information, such as the repository ID from the event descriptors and the build steps from the deployment descriptor. Other information (such as the deployment identifier and the authorization token) may be generated by the CI management system 106. Once a deployment request is created, it is queued for execution.

Next, the CI management system 106 retrieves the queued deployment request and executes it. Typically this is done by launching a container, retrieving the source code revision from the SCM system 104, executing the build steps, capturing the output of the deployment and deleting the container.

Upon commencing the execution of the deployment, the CI management system 106 is configured to update the status of the deployment based on the result. It is configured to communicate information about the deployment to the tracking system 108 at step 210. In certain embodiments, this information may include the deployment ID, the corresponding commit ID, repository ID, an identifier of the user that requested the deployment (e.g., either by pushing the source code revision into the SCM repository or by manually selecting a particular source code revision for deployment), the date and time the deployment was executed, the environment in which the source code revision was deployed, and status of the deployment (e.g., "in progress"). The CI management system 106 then updates the status once the deployment is complete (to "success" of "failed" for instance). Status of the deployment includes, e.g., whether the deployment is queued/pending, in progress, completed, successful or unsuccessful. When the deployment request is first created, the status of the deployment is set as queued/pending. This status is updated during the deployment process. For example, when the deployment is initiated, the status is updated to 'in progress' and once it is completed the status may be updated to 'completed', 'successful' or 'unsuccessful' (depending on the outcome of the deployment). Further, the CI management system 106 stores any artifacts created as part of the deployment in a suitable internal database. These artifacts may be used to redeploy a build in a particular environment and in some cases to deploy the build in a subsequent environment.

Information about the deployment may be forwarded to the tracking system 108 in the form of a tracking descriptor. Table D illustrates an example deployment tracking descriptor below. Although a table has been used to illustrate information stored in the deployment tracking descriptor, the relevant information need not be stored in a table and could be stored in any appropriate format (e.g. a simple text file, a JSON file, an XML file, etc.).

TABLE D

| tracking descriptor | |
| --- | --- |
| Deployment ID | 8374 |
| Repository ID | 347kdsfjh38764 |
| Commit ID | 7a273a067efbf16ec83d885ad79a7a626f2eec3f |
| User ID | John_Doe |
| Date | 19 June 2018 09:06:30 |
| Environment | Testing |
| Status | in progress | ticular environment and/or request the tracking system 108 to present detailed information about a single deployment.

To generate user interfaces that provide this type of information, the tracking system 108 stores deployment tracking information in the deployment database 118 for various repositories. To this end, the tracking system 108 first receives deployment information from the CI management system 106. In some embodiments, the CI management system 106 may be configured to provide this information in the form of tracking descriptors (see table D) to the tracking system 108 whenever deployments are queued and/or completed. In other cases, the tracking system 108 may be configured to poll the CI management system 106 periodically to determine if any deployment descriptor are available.

In any case, the tracking system 108 receives deployment information for queued and executed deployments from the CI management system 106. This information is stored in the deployment database 118.

An example of a data structure storing deployment information is illustrated in table E below. Although a table is used to illustrate the data structure, the relevant information need not be stored in a table and could be stored in any appropriate format.

TABLE E

Example tracking information data structure

| Deployment ID | Build ID. | Commit ID | Repository ID | Name | Date | User ID | Env. |
| --- | --- | --- | --- | --- | --- | --- | --- |
| ... | ... | ... | ... | ... | ... | ... | ... |
| 333 | 101 | 7778e48 | 3vvvvvvvvvv47kdsfjh3876 | Build and test | June 19, 2018 | John_Doe | Testing |
| 302 | 38 | 3846hfd | 4478frhjksdf8 | Deploy to staging | June 18, 2018 | Jane_Deer | Staging |
| 298 | 100 | F89dsh4 | 347kdsfjh3876 | Add Bitbucket client repo to submodules | June 3, 2018 | Suzie_Mclean | Production |
| 297 | 37 | 58973hf | 4478frhjksdf8 | Update Docker compose to remove breaking code | June 3, 2018 | Ryan_Gosming | Testing |
| 288 | 100 | F89dsh4 | 347kdsfjh3876 | Add Bitbucket client repo to submodules | May 27, 2018 | Suzie_Mclean | Staging |
| ... | ... | ... | ... | ... | ... | ... | ... |

The CI management system 106 may retrieve some of the required information for this descriptor, such as the repository ID, commit ID, and user ID from the event descriptor. Other information such as the deployment ID is retrieved from the deployment request and the date and environment may be retrieved once the deployment is completed. Further, the status of the deployment can be retrieved from the CI management system 106.

The tracking system 108 stores the information received in the tracking descriptor in the deployment database 118 at step 212 to be used when information about the deployment is requested.

As described previously, the tracking system 108 communicates with the CI management system 106 to receive data about deployments and with client devices 102 to present deployment information to users. For example, a user may access the tracking system 108 via the tracking client and may request the tracking system 108 to display status of deployments in a particular repository, in a par- Further, although the data structure shows deployments corresponding to different repositories, in some embodiments, the tracking system may maintain different tracking data structures for different repositories, such that one data structure only includes deployment information for a single repository. In addition, the tracking information data structure may include a field indicating the status of each deployment.

It will be appreciated that a particular deployment pipeline may include multiple steps—such as 'deploy to test' and if successful 'deploy to staging'. The deployment in each stage may be stored as a separate record in the database 118 with its own unique deployment ID. 'Build ID' or 'build #' on the other hand may correspond to a particular pipeline and therefore may be the same for different steps. In the example above, the database stores two deployments with IDs 298 and 288 for the same source code revision and repository. In this case, although the deployment IDs are different, the build IDs are the same.

As noted previously, the tracking system 108 may receive various different types of requests from client devices 102 to view deployment information. In one example, a developer may wish to view a list of recent deployments made for a particular repository. In another example, a developer may wish to view a deployment pipeline for a particular source code revision. In each of these cases the tracking system 108 generates and forwards a suitable user interface for rendering on the client device 102. The user interface generated in response to a request of the first example is a deployment history user interface and the user interface generated in response to the request of the second example is a deployment pipeline user interface.

In order to request a deployment history user interface, a user may open the CI management client or the tracking client on their client device 102. This action causes the client device 102 to generate and forward a tracking information request to the tracking system 108. The tracking information typically includes information required by the tracking system 108 to service the request and may vary depending on the type of request. At the very least, it includes an identifier of the repository associated with the developer. In addition to this, it may include other information. For example, if the user wishes to view deployments in a particular environment or just view the most recent deployments in each environment, the tracking information request may further include the environment ID of the environment the user wishes to view or a limit on the number of deployments to retrieve from each environment. The tracking request may further include a user identifier of the user of the client device 102

Using the repository identifier, the tracking system 108 retrieves a list of latest deployments for that repository from the deployment database 118. The number of deployments retrieved in the list may be configurable. For example, the tracking information request may include a field indicating the number of requested records (e.g., 20 latest deployments) for that repository.

Figure 3:
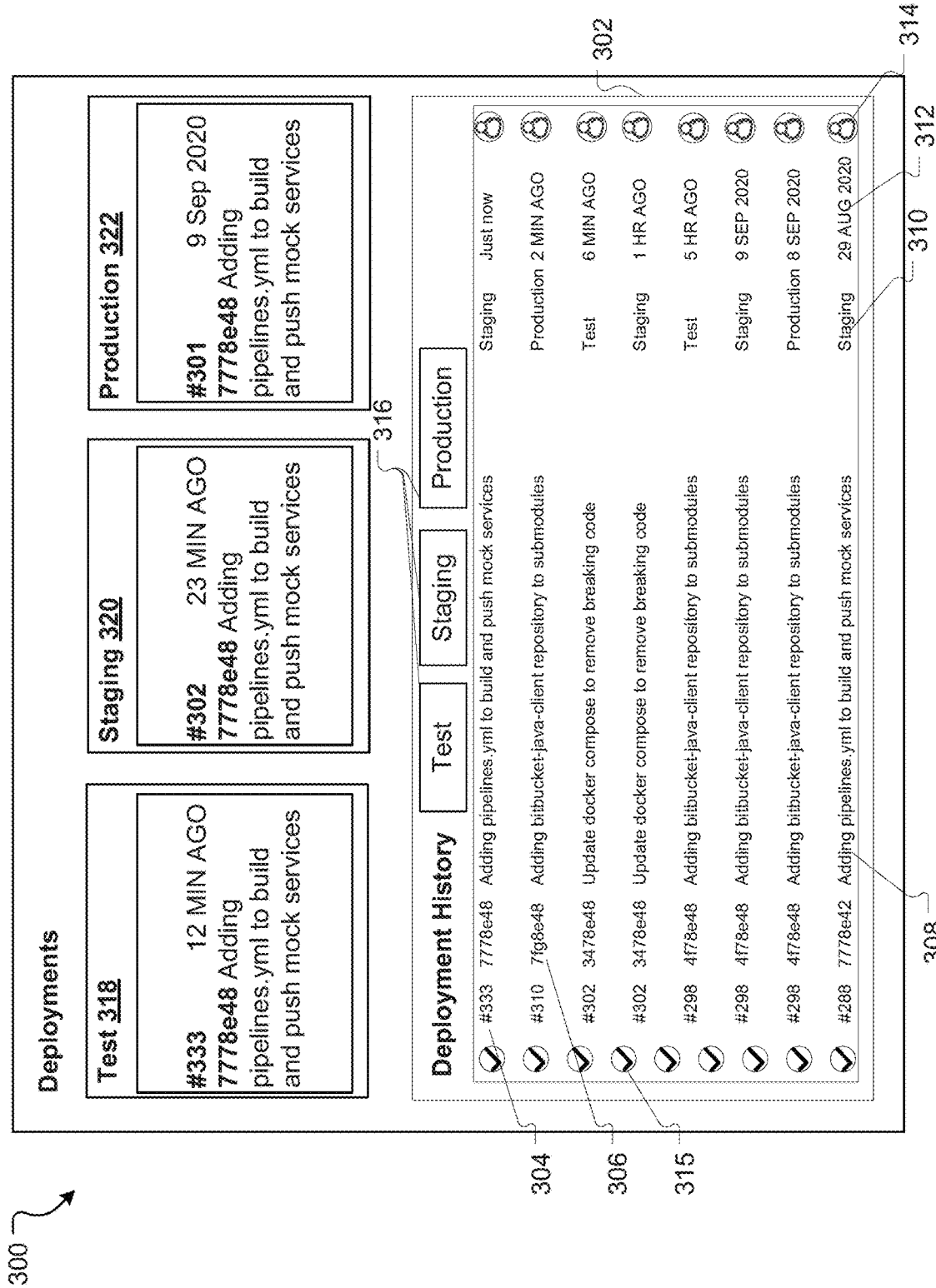
FIG. 3 is an example deployment history user interface.

This list of records (along with corresponding deployment information) is forwarded to the requesting client device 102 for rendering on a display of the client device. FIG. 3 illustrates an example deployment history dashboard 300 rendered by a client application (e.g., tracking client) on the client device 102. Generally speaking, the dashboard 300 includes a summary of the latest deployments in the repository associated with the user accessing the dashboard 300. In particular, in this example, the dashboard 300 includes a deployment history section 302, which includes information about the latest deployments (arranged in date order such that the latest deployment is displayed on top). Each row in the history section 302 may display information about a particular deployment including the build number 304, the commit ID 306, a description 308, the environment in which it was deployed 310, date of the deployment 312, and an identifier of the user 314 that caused the deployment. Status 315 of each deployment (e.g., completed or in-progress) may also be displayed in the history section 302.

The dashboard 300 further includes one or more filtering controls 316 to filter the deployments based on one or more information fields of the deployments, such as the environment, date range, the author, etc. This allows the developer to view selected deployments, for example, deployments pertaining to a particular environment, deployments triggered by a particular user 314, deployments made within a certain date range, etc. FIG. 3 illustrates three filtering controls, 'test', 'staging' and 'production' to filter deployment history based on deployment environments.

Further, the dashboard 300 may include a section showing the latest deployment in each environment. In FIG. 3 this is displayed in the form of user interface cards 318, 320 and 322.

FIG. 4 shows a user interface 400 that is displayed when a user selects one of the filtering controls 316 of dashboard 300 (in particular the test environment filtering control 316).

As seen in this dashboard, the deployment history section is updated to reveal the latest deployments in the test environment. In this case, build numbers 331-338 have been deployed in the test environment recently. Of these deployments, build number 332 and 335 have not successfully been deployed whereas the others have been successfully deployed.

In addition to the usual information about each deployment, the deployment history section 402 also provides one or more selectable affordances 404 to perform one or more auxiliary actions on the displayed deployments. In the example shown in FIG. 4, the selectable affordance is in the form of ellipses. Selection of the selectable affordance 404 causes a dropdown menu with available actions to be displayed. In certain embodiments, one of the auxiliary actions is a redeploy action, which causes a particular deployment to be redeployed in the given environment. In other examples, instead of a dropdown menu, the auxiliary functions may be provided by individual selectable buttons on the particular deployment. For example, one or more deployments may include a selectable icon for requesting a redeployment.

In other cases, instead of wishing to view deployment history in a particular environment, the user may wish to view a particular deployment pipeline—e.g., to check which environments it has already been deployed in, which environments it needs to be deployed in, etc.

Figure 5:
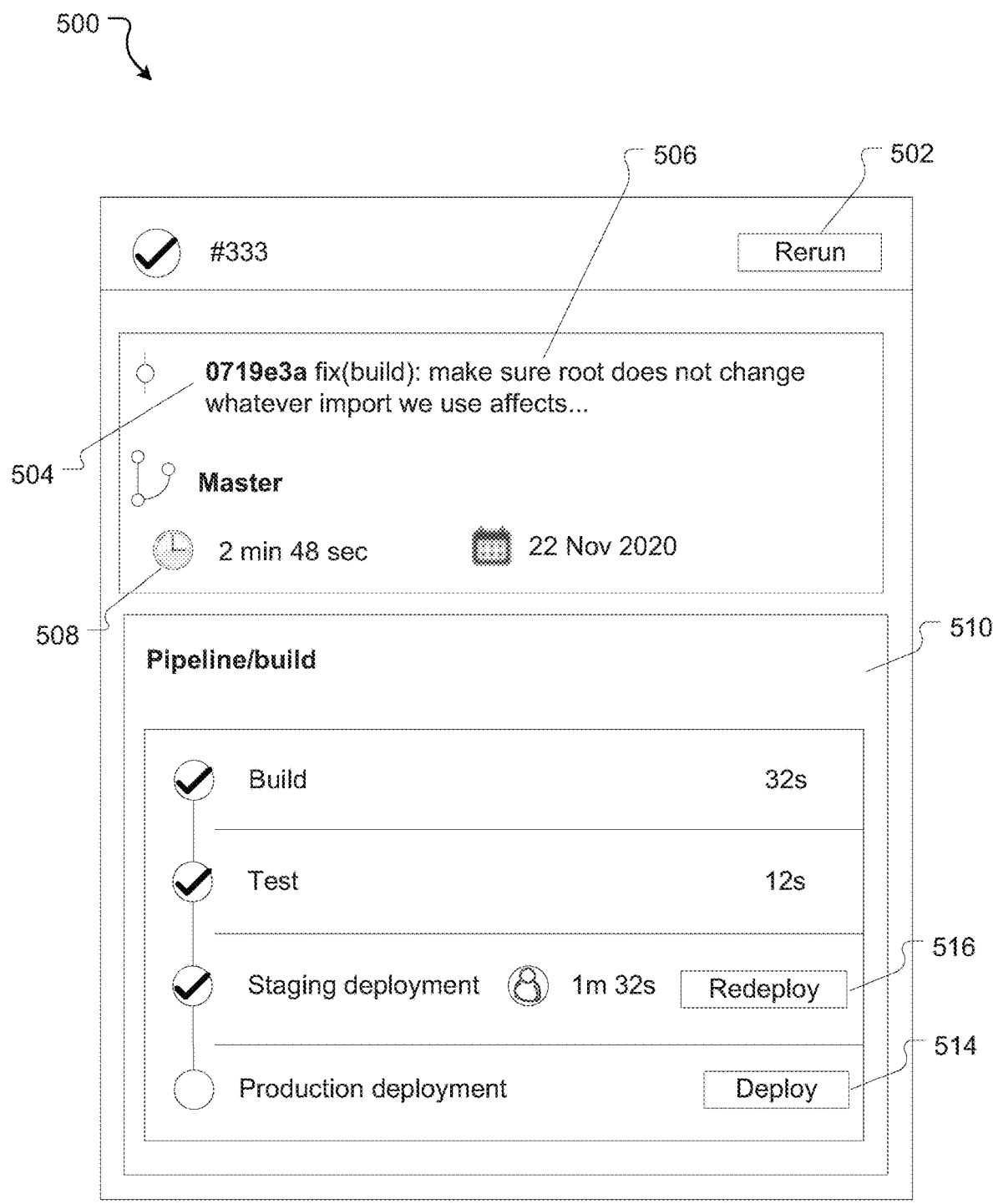
FIG. 5 is an example deployment pipeline user interface.

FIG. 5 shows an example deployment pipeline user interface 500. In this example, the user interface 500 shows details about build #334. Card 502 illustrates key information about the source code revision, including the commit ID 504, description 506, time since the build was deployed 508, and the date on which it was deployed.

Card 510 shows the steps of the deployment pipeline. In this case, the build, test, and staging steps have been completed whereas the production step still need to be performed. That is, the build has already been deployed in the test and staging environments but has yet to be deployed to the production environment.

From the deployment pipeline user interface 500, a developer (if he/she has the required permissions) may be able to deploy a source code revision in a particular environment and/or redeploy a particular source code revision in an environment. As shown in card 510, the user interface 500 provides a selectable affordance 514 to deploy build #333 in the production environment and a selectable affordance 516 to redeploy build #333 in the staging environment.

Accordingly, there may be at least two mechanisms by which a source code revision can be redeployed in a particular environment—either via the deployment history user interface 400 or via the deployment pipeline interface 500.

In the following sections, example methods for redeploying a deployment in a given environment are discussed. Suppose for a particular source code, the current deployment in the staging environment is deployment build #100 and a developer identifies a bug in the source code corresponding to build #100. The developer may decide to roll back the deployment in the staging environment to a previous deployment, e.g., build #98 (which didn't have this specific bug) until the developer can find a solution to fix the identified bug. The example methods described here can be used to perform such rollbacks/redeployments.

In particular, the example method described with reference to FIG. 6 can be used to redeploy a source code revision from the deployment history user interface 400 whereas the method described with reference to FIG. 9 can be used to redeploy a source code revision from the deployment pipeline user interface 500.

Method 600 (shown in FIG. 6) commences at step 602 when a client device makes a request for a deployment history user interface. In one example, a user operating on a client device 102 can request the tracking system 108 to display the deployment history in a particular environment (e.g., testing environment) for a particular repository. To this end, the client device and in particular the tracking client operating on the client device creates a tracking request including at least a user identifier of the user making the request, a repository identifier of the repository associated with the user, and an identifier of the selected environment type.

The tracking system 108 receives the tracking request, and based on the received repository identifier and environment identifier retrieves the latest deployments for the selected repository in the selected environment from tracking database 118 at step 603.

Next, at step 604, the tracking system determines whether one or more of the retrieves deployments can be redeployed. In some implementations, any deployment that has previously been deployed in an environment (successfully or not) may be redeployed in that environment. In other cases, only deployments that have already successfully been deployed in an environment can be redeployed in that environment. Further still, as redeployments use the artifacts that were created when the build was originally deployed to that environment, the artifact needs to be available for the build to be redeployed.

Accordingly, in some embodiments, at step 604, for each of the retrieved deployments, the tracking system 108 determines the status of the deployment in the selected environment (e.g., based on information in the tracking database 118). The deployments that were not successfully deployed in that environment are discarded. For the remaining deployments, the tracking system 108 determines whether artifacts exist. To this end, the tracking system 108 may send a request for artifact information to the CI management system 106. The request includes deployment identifiers of the successful builds. The CI management system 106 may perform a lookup for the artifacts corresponding to the received deployment identifiers. If corresponding artifacts are found, the CI management system 106 may communicate a confirmation. Alternatively if corresponding artifacts are not found for one or more of the deployments the CI management system 106 may communicate a negative message.

Based on the response from the CI management system 106, the tracking system 108 may further cull the list of deployments that can be redeployments.

Once the tracking system has determined which deployments can be redeployed, if it determines that at least one deployment is redeployable, the tracking system 108 communicates the list of the latest deployments in the selected repository and environment identified at step 602 along with their corresponding information to the client device at step 606. Further, for the deployments that were determined to be candidates for redeployment at step 604, the tracking system 108 communicates that redeployment is possible at this step. In some examples, this communication may be in the form of a flag—a value of TRUE indicating that redeployment is possible for the corresponding deployment and a value of FALSE indicating that redeployment is not possible.

Based on the information received from the tracking system 108, the client device renders the deployment history user interface. In some examples, this user interface may be similar to user interface 400. Further, in the rendered user interface, for the deployments that can be redeployed, a "redeploy" selectable affordance 404 may be enabled. For the deployments that cannot be redeployed (e.g., because they were not successfully deployed in the first instance and/or their corresponding artifacts no longer exist in the CI management system database), the selectable affordance may be disabled. In case the redeployment option is presented as part of a drop-down menu, for the deployments where redeployment is not possible, this option is not displayed.

Next, at step 608, a determination is made whether redeployment request has been made with respect to a deployment displayed in the deployment history user interface 500. In one example, the user may select a deployment from the displayed deployment history (e.g., build #336) for redeployment (e.g., by selecting a corresponding selectable affordance) in the selected environment (e.g., testing environment). In this case, the tracking client creates a redeployment request including the build number of the selected deployment and the selected environment identifier and forwards the redeployment request to the tracking system 108.

If the tracking system 108 receives such a redeployment request, the method 600 proceeds to step 610, where the tracking system 108 generates a preview user interface of the redeployment and communicates the preview user interface to the tracking client for display on the user device 102. As the name suggests, the preview user interface shows a preview of the consequences of performing the redeployment. In particular, it may show a list of commit identifiers that will be reversed if the selected deployment is redeployed. In addition, in some cases, the preview may depict a list of issue tracking system issues that will be reverted in case the deployment is redeployed.

In essence, the developer may review the preview user interface and determine whether the developer still wishes to proceed with the redeployment.

At step 612 a determination is made whether the developer wishes to continue with the redeployment. In one example, the preview user interface may include a further selectable affordance to confirm redeployment. If the user selects this affordance, the tracking client sends a confirmation message back to the tracking system 108 indicating that the developer wishes to continue.

If at step 612 a confirmation messages is received at the tracking system 108, the method proceeds to step 614 where the tracking system 108 instructs the CI management system 106 to rerun the selected deployment. The request may include the commit ID associated with the deployment, the original deployment identifier and/or the build identifier.

Once the CI management system 106 receives the redeployment request, it queues the redeployment request for execution. It also retrieves the artifact corresponding to that build step and stores it along with the deployment request. It may also generate a tracking descriptor and update the status of the deployment in the tracking descriptor to "pending". In some examples, the original deployment descriptor associated with the original deployment is updated. In other examples, the CI management system 106 may generate a new deployment descriptor. In case a new deployment descriptor is generated, the deployment identifier may be different from the original deployment descriptor, but the remaining information in the tracking descriptor may be the same. The tracking descriptor is forwarded to the tracking system 108. The tracking system 108 in turn communicates the status of the redeployment request to the client device based on the status of the deployment received in the tracking descriptor. The tracking client in turn may update the status of the deployment in the deployment history user interface to indicate that the redeployment is pending.

Subsequently, the CI management system 106 re-executes the deployment with the retrieved artifact. In one example, the CI management system 106 re-executes the deployment using the process described with reference to step 208 of FIG. 2.

After the source code revision is redeployed, the CI management system 106 may update the status of the deployment in the tracking descriptor from "pending" to "successful" or "unsuccessful". This notification is communicated to the tracking system 108, at step 616, which forwards the communication to the client device 102 and stores the updated tracking descriptor in its own database. The tracking client in turn updates the status of the deployment in the deployment history user interface to indicate whether the build has been successfully redeployed or whether the redeployment attempt has been unsuccessful. In one example, the status notification for indicating successful redeployment is different from the status notification for indicating successful deployment so that a user can easily distinguish between deployments and redeployments in the user interface.

Returning to step 604, if at this step the tracking system 108 determines that none of the latest deployments for the selected environment are redeployable, the tracking system 108 communicates the list of the latest deployments in the selected repository and environment identified at step 602 along with their corresponding information to the client device at step 618. As no redeployment is possible in this situation, the method 600 ends after this step.

Further, returning to steps 608 and 612, if a redeployment request or confirmation is not received, e.g., because the user did not select the option to redeploy a source code revision from the deployment history UI 400 or failed to confirm redeployment from the preview UI, the method 600 ends.

As described with reference to method step 610, the tracking system 108 generates a preview user interface upon receiving a redeployment request from a tracking client. In order to generate this preview user interface, the tracking system 108 may collect further information about the deployment from external systems (e.g., the SCM system 104 and/or the ITS 114).

Figure 7:
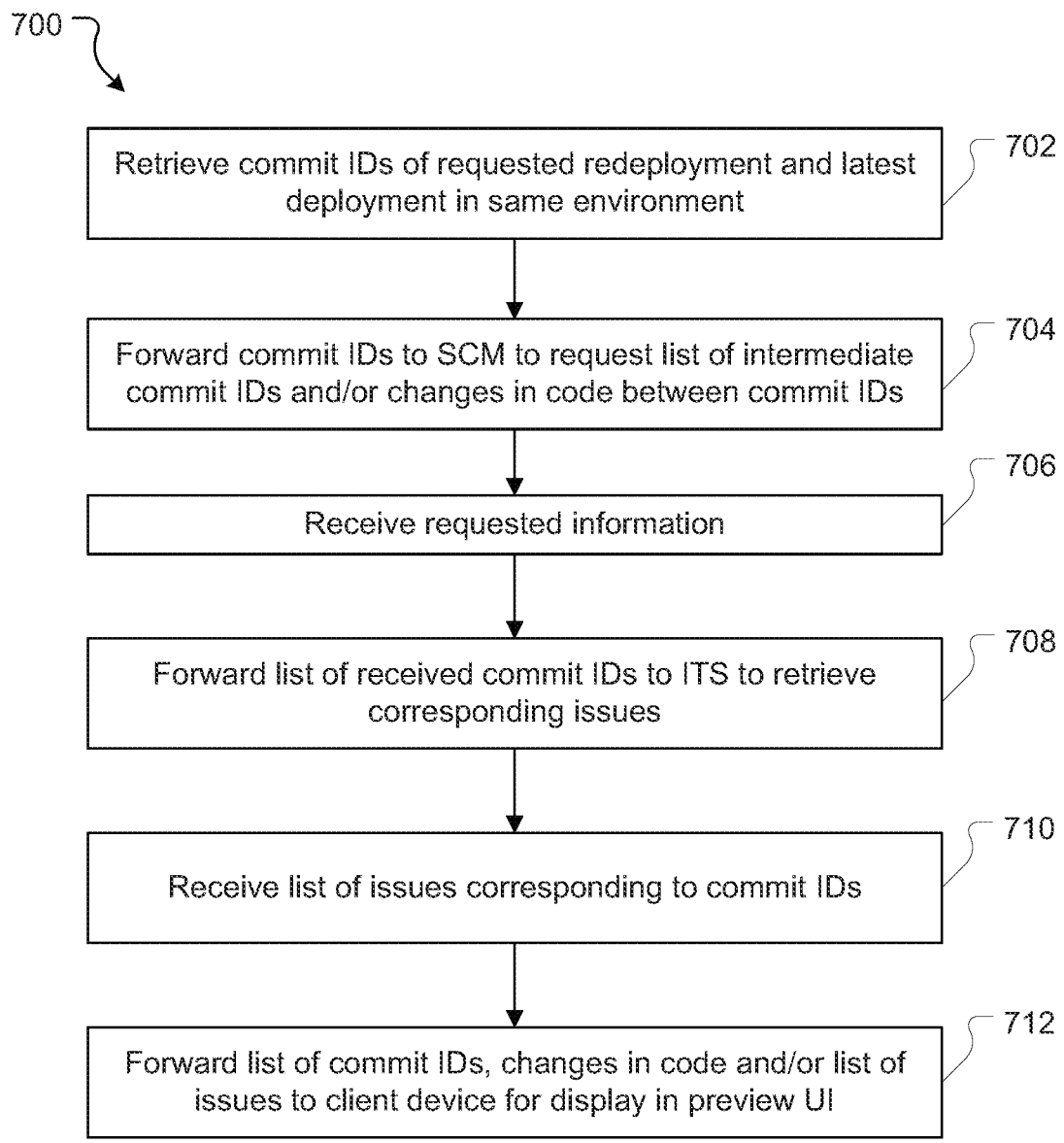
FIG. 7 is a flowchart illustrating an example method for generating a redeployment preview user interface.

FIG. 7 illustrates an example method 700 for generating this preview user interface. The method commences at step 702, where the tracking system 108 retrieves a list of source code revisions that exist between the latest deployment in the selected environment and the deployment selected for redeployment and/or changes in the source code between the two deployments from the SCM system 104.

As described previously, developers usually work locally on their source code and may update source code locally in the SCM client multiple times (by 'committing' the source code locally) before 'pushing' the source code to the SCM system 104. Similarly, developers may commit a number of updates to the source code on a particular branch, e.g., a development branch, before pushing the updates onto the master branch (which is the branch on which deployments are executed). Accordingly, there may be a number of undeployed and deployed source code revisions between the latest deployment in the selected environment and the selected redeployment.

At step 702, the tracking system 108 retrieves information about these intervening source code revisions from the SCM system 104. To this end, the tracking system 108 retrieves the commit IDs corresponding to the deployment selected by the developer for redeployment and the latest deployment in that environment. For example, in the deployment history UI shown in FIG. 4, if the user selects build #336, the tracking system 108 retrieves the commit ID corresponding to that build number—i.e., commit ID d24c24f. It also identifies the latest deployment in that environment—i.e., build #338 and retrieves the commit ID corresponding to that deployment—i.e., commit ID 0719e3a.

At step 704, the tracking system 108 requests the SCM system 104 to provide a list of commit IDs corresponding to source code revisions that exist between the two commit IDs. Further, it may request the SCM system 104 to provide a list of changes in the source code that occurred between the two commit IDs.

The requested information (i.e., the list of commit IDs and/or the changes in source code between the two commit IDs) is received at the tracking system 108 at step 706.

Next, in certain embodiments, where the environment 100 includes an ITS 114 for managing issues related to software development, the tracking system 108 requests the ITS 114 to forward one or more issues related to the commit IDs received at step 706 and/or related to the commit IDs forwarded to the SCM at step 704. The request includes the list of commit IDs.

The ITS 114 compares the list of commit IDs with commit IDs of issues managed by the ITS 114 (e.g., by performing a lookup of the commit IDs in a commit ID field of the issues maintained by the ITS 114).

If the ITS 114 identifies any issues corresponding to the received commit IDs, it forwards a summary of the identified issues to the tracking system 108, which at step 710, receives the summary of the issues. The summary may include, for example, a description of the issue, status of the issue (resolved, pending, etc.), author of the issue, the related commit ID, and any other such relevant information.

At step 712, the information received from the external sources (e.g., the list of commit IDs, updates to the source code between the two deployments, and/or the issues associated with the source code between the two deployments) is forwarded to the client device 102 for rendering in the preview user interface.

Figure 8:
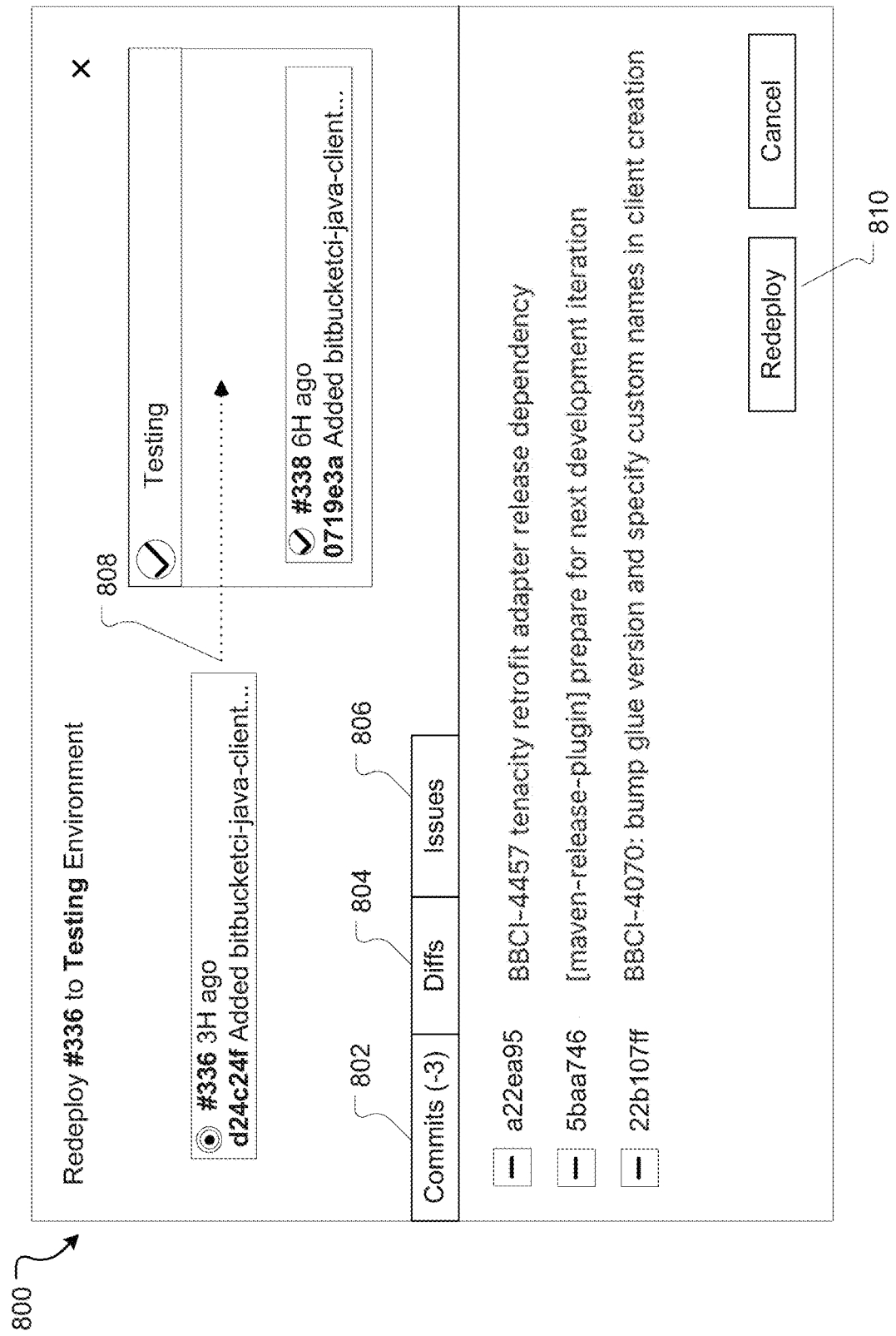
FIG. 8 is an example redeployment preview user interface.

FIG. 8 is a screenshot illustrating an example preview user interface 800 including a number of tabs 802, 804, and 806, each displaying a different aspect of the particular redeployment (i.e., redeployment #336). In particular, tab 802 illustrates a list of commits (3 in this case) between deployments 336 and 338 in the testing environment. If the selected source code revision is redeployed in the testing environment, 802 shows the list of commits that will be affected and will be effectively "undeployed" from the environment. In addition to the commit ID, the tab 802 displays a name/description of the commit. In some embodiments, tab 802 may also display the author of the commit.

The developer may toggle between tabs 802-806 to change the displayed information. For instance, if tab 804 is selected, differences in source code between the two deployments may be displayed. If the selected source code revision is redeployed in the testing environment, tab 804 illustrates the source code lines that would essentially be "undeployed" from the environment. Further, if tab 806 is selected, a summary of the issues related to any of the commit ID between deployments 336 and 338 may be displayed. If the selected source code revision is redeployed in the testing environment, tab 806 illustrates the issues that would be affected by the redeployment.

This way a developer is made aware of the issues that may arise if that particular source code revision is promoted to the next development stage.

The user interface 800 further includes one or more controls 808, 810 to trigger a promotion from one environment to another. In the example UI 800, one control may be a dragging action to drag build #336 to the testing card 318. Another control may be the 'redeploy' affordance 810 located at the bottom right corner of the user interface 800.

In addition to allowing users to redeploy deployment 336 to the testing environment, UI 800 may also include indication of the latest deployment in the testing environment (e.g., build #338 in this example UI).

It will be appreciated that FIG. 8 illustrates an example preview UI for obtaining user approval to redeploy a source code revision. The tracking client may be configured to render any other types of UIs for obtaining this approval. For instance, the tracking client may present a dedicated page for redeployments that lists a number of deployments available for redeployment. A user may be able to select multiple redeployments (not in the same environments obviously) from such a UI. Alternatively, the client application may notify users of available redeployment by displaying an alert or pop-up window (e.g., in dashboard 400 or 500) via which the user may be able to trigger a redeployment.

Figure 9:
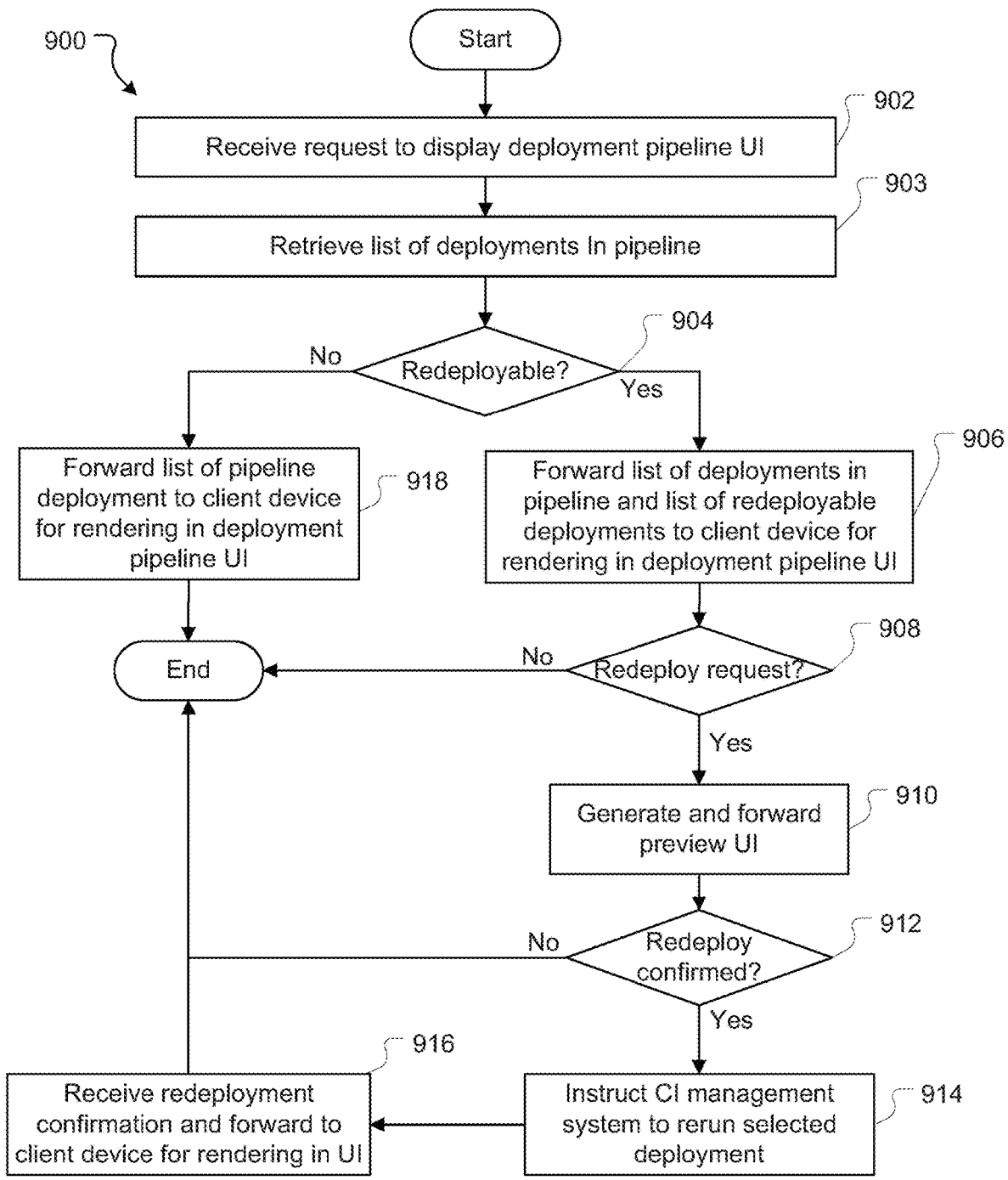
FIG. 9 is a flowchart illustrating an example method for redeploying a source code revision from a deployment pipeline user interface.

FIG. 9 is a flowchart illustrating an example method for redeploying a source code revision in a selected environment from a deployment pipeline user interface. The method commences at step 902 where a request for rendering a deployment pipeline user interface is received at the tracking system 108. In one example, a user operating on a client device 102 can request the tracking system 108 to display the deployment pipeline interface (e.g., UI 500) for a particular source code revision pipeline in a particular repository. To this end, the client device 102 and in particular the tracking client operating on the client device creates a tracking request including at least a user identifier of the user making the request, a repository identifier of the repository associated with the user, and an identifier of the selected build number.

The tracking system 108 receives the tracking request, and based on the received repository identifier and build number retrieves the tracking descriptors corresponding to the build number from tracking database 118 at step 903. For instance, the tracking system 108 may retrieve tracking descriptors for that build in the testing environment, in the staging environment and in the product environment.

Next, at step 904, the tracking system 108 determines whether any of the deployments in the pipeline can be redeployed. This is similar to step 604 of FIG. 6 and therefore is not described in detail here again.

Once the tracking system 108 has determined which deployments can be redeployed, it communicates the list of the deployments in the selected pipeline along with their corresponding information to the client device. Further, for the deployments that were determined to be candidates for redeployment at step 904, the tracking system 108 communicates that redeployment is possible at this step. In some examples, this communication may be in the form of a flag—a value of TRUE indicating that redeployment is possible for the corresponding deployment and a value of FALSE indicating that redeployment is not possible.

Based on the information received from the tracking system 108, the client device renders the deployment pipeline user interface. In some examples, this user interface may be similar to user interface 500. Further, in the rendered user interface, for the deployments that can be redeployed, a "redeploy" selectable affordance may be enabled. For the deployments that cannot be redeployed (e.g., because they were not successfully deployed in the first instance and/or their corresponding artifacts no longer exist in the CI management system database), the selectable affordance may be disabled.

Next, at step 908, a determination is made whether redeployment request has been made with respect to a deployment displayed in the deployment history user interface 500. In one example, the user may select a deployment from the pipeline (e.g., deployment in staging environment) for redeployment (e.g., by selecting a corresponding selectable affordance). In this case, the tracking client creates a redeployment request including the deployment identifier of the selected deployment (e.g., build number and environment) and forwards the redeployment request to the tracking system 108.

Figure 6:
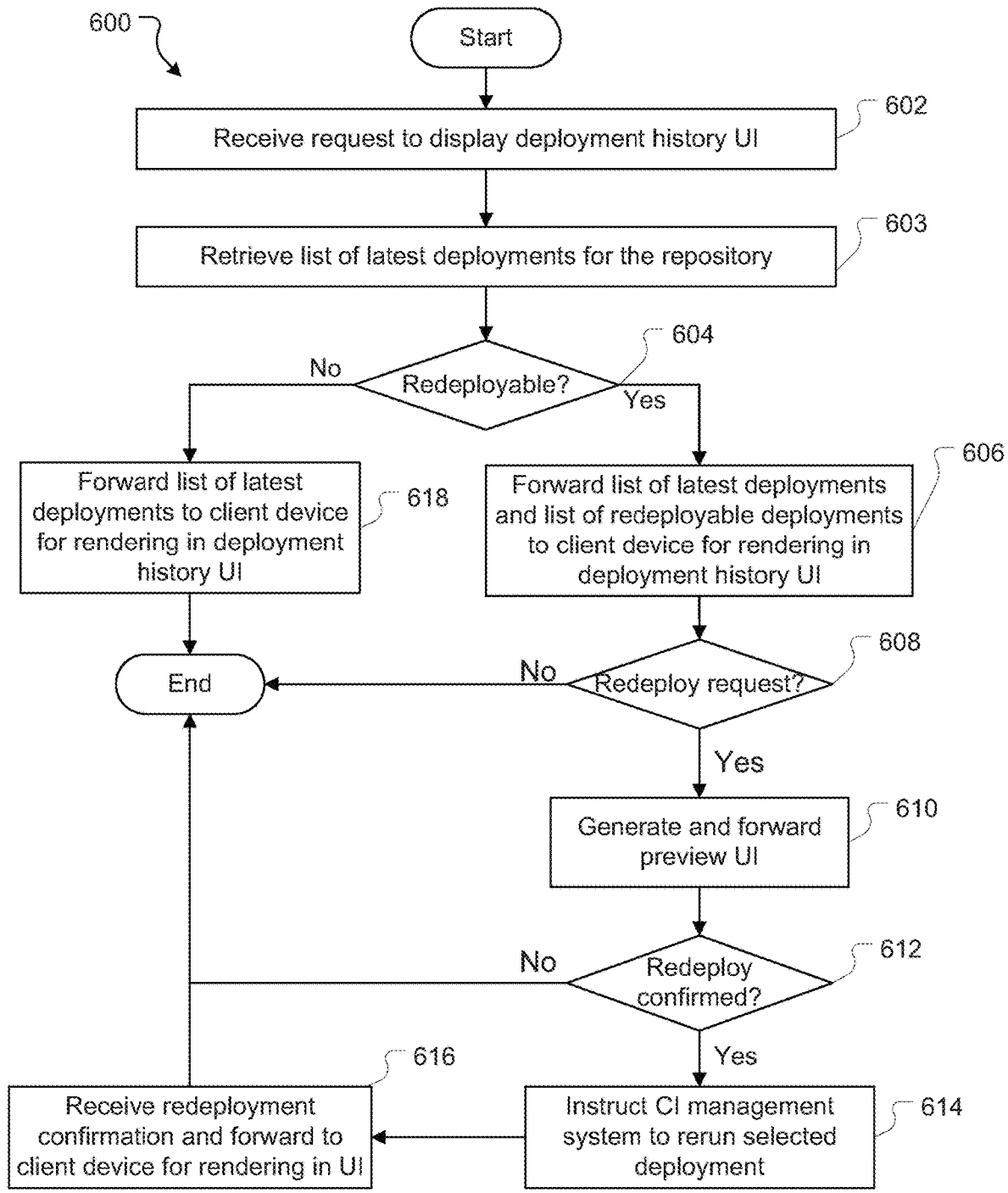
FIG. 6 is a flowchart illustrating an example method for redeploying a source code revision from a deployment history user interface.

The tracking system 108 then generates a redeployment preview interface similar to the interface 800 at step 910 and the remainder of method 900 is similar to the method steps 610-618 of FIG. 6 and therefore are not repeated here again.

In the embodiments described above, the tracking system 108 determines that redeployment is possible based on the previous deployment status and whether a previously created artifact is still available at the CI management system 106. In some other embodiments, the tracking system 108 may also determine whether the user viewing the deployment history interface in method 600 or the deployment pipeline interface in method 900 has permission to request redeployment. In some cases, not all developers associated with a given software application may have permission to redeploy a corresponding build. In other cases, some developers may only have permission to redeploy in certain environments (e.g., testing), but not other environments (e.g., production). The permissions can be set globally for all deployments or they can be set individually for each environment such that different developers have different sets of permissions in different environments. These permissions may be stored in the CI management system and/or the SCM system 104. Accordingly, in some cases, the tracking system 108 may forward the user identifier received as part of the tracking request to the CI management system 106 and/or the SCM system 104 to determine whether the user has permission to promote any of the deployments to be displayed on the corresponding user interface. If the user does not have permission to redeploy any deployments, the redeploy selectable affordance is disabled. Alternatively, if the user has permission to redeploy any of the deployments, and the other conditions for redeployment are also met, the corresponding redeploy selectable affordances may ne enabled.

Further still, in other embodiments, the check to determine whether redeployment is possible may not be performed before rendering the corresponding user interface. Instead, this check may be performed when a user selects a particular redeploy affordance and a redeploy request is received at the tracking system 108. If it is determined at this stage that redeployment is possible, the redeployment preview UI may be displayed. Alternatively, if it is determined that redeployment is not possible (e.g., because initial source code version wasn't successfully deployed in that environment, corresponding artefact has expired or user doesn't have permission), an error message may be returned to the tracking client, which renders the error message on the client device 102. In this alternative embodiment, the tracking system 108 only needs to perform this check if redeployment is requested and even then only of the requested deployment, which reduces unnecessary calls between the tracking system 108 and the CI management system 106 or SCM system 104.

The operations/techniques described herein are implemented by one or more special-purpose computing systems or devices. For example, in networked infrastructure 100: SCM system 104 may be provided by a computer system; the client devices 102 are computer systems; the CI management system 106 is provided by one or more computer systems; the tracking system 108 is provided by one or more distributed computing systems, and the computing resources on the cloud computing platform 116 are also provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 10:
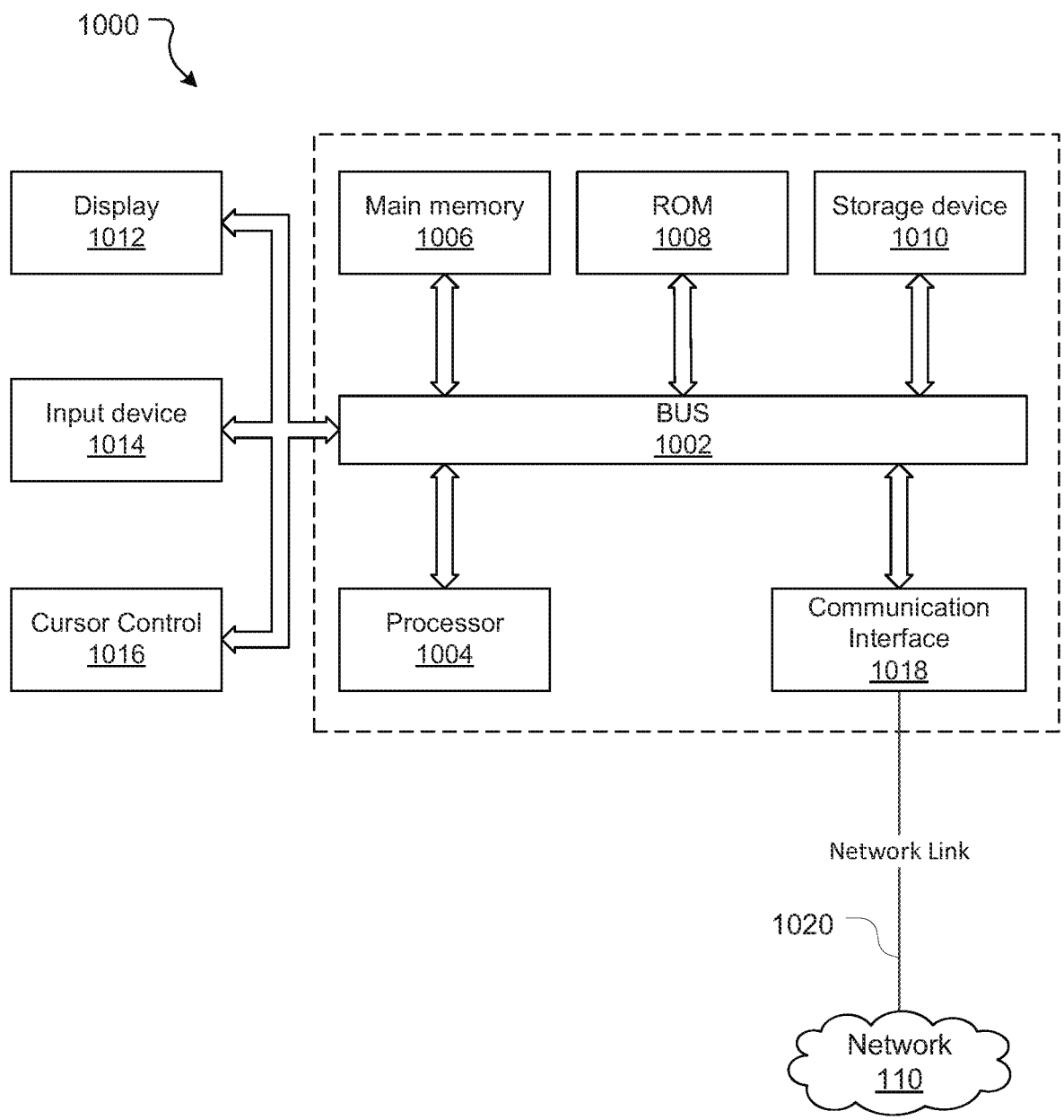
FIG. 10 is a block diagram illustrating a computer system, which may be used to implement various embodiments.

By way of example, FIG. 10 provides a block diagram that illustrates one example of a computer system 1000 upon which embodiments of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor, a graphical processing unit, or other processing unit.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

In case the computer system 1000 is the client device 102, the computer system 1000 may be coupled via bus 1002 to a display 1012 (such as an LCD, LED, touch screen display or other display), for displaying information to a computer user. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Computer system 1000 also includes a communication interface 1018 coupled to bus 1002. Communication interface 1018 provides a two-way data communication coupling to a network link 1020 that is connected to the communication network 110. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Computer system 1000 can send messages and receive data, including program code, through the network(s) 110, network link 1020 and communication interface 1018. In case the computer system hosts the CI management system 106, the computer system 1000 may receive an event notification from the SCM system 104 via the network 110, network link 1020, and communication interface 1018. The received event notification may be executed by processor 1004 as it is received, and/or stored in storage device 1010, or other non-volatile storage for later execution.

As described previously, the computer system 1000 as described above may be configured in a plurality of useful arrangements. In one arrangement, the computer system 1000 is a server computer (such as a computer system hosting the CI management system 106) comprising one or more non-transitory computer-readable data storage media stored with one or more sequences of instructions/software modules which when executed cause the computer to perform the operations/techniques that are described herein.

Some aspects of the present disclosure are described with respect to three deployment environments—testing, staging, and production. However, the systems and methods disclosed herein are not limited to three environments or just these environments. Instead, in some implementations, source code revisions may be deployed in multiple different environments (e.g., multiple testing environments, and/or multiple production environments). Which environments a particular build is meant to be deployed in can be defined in the deployment descriptor.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A computer-implemented method, the method comprising:
  receiving, from a client device, a request to display a deployment history of a target environment;
  in response to the request, obtaining a list of a previous deployments associated with a repository identified in the request;
  analyzing the list of previous deployments to identify a subset of previous deployments that is redeployable in the target environment;
  causing display of at least a portion of the subset of previous deployments that is redeployable on a display of the client device;
  in response to a user selection of a displayed element associated with a particular previous deployment that is redeployable in the target environment, causing display of a preview user interface on the client device, the preview user interface including a listing of one or more items to be reverted in response to rolling back to the particular previous deployment; and
  in response to a user selection of a selectable affordance displayed on the client device, causing a roll back of a current code deployment to the particular previous deployment in the target environment.

2. The computer-implemented method of claim 1, wherein the list of one or more items to be reverted in response to rolling back to the particular previous deployment in the target environment comprises one or more issues associated with rolling back from the current code deployment in the target environment to the particular previous deployment in the target environment.

3. The computer-implemented method of claim 2, wherein the one or more issues associated with rolling back from the current code deployment in the target environment to the particular previous deployment in the target environment are identified based on a list of source code revisions between one or more source code revision identifiers associated with the particular previous deployment in the target environment and one or more source code revision identifiers associated with the current code deployment in the target environment.

4. The computer-implemented method of claim 1, wherein analyzing the list of previous deployments to identify the subset of previous deployments that is redeployable in the target environment comprises determining whether an artifact corresponding to a deployment of the list of previous deployments that has been successfully deployed in the target environment is available.

5. The computer-implemented method of claim 1, wherein analyzing the list of previous deployments to identify the subset of previous deployments that is redeployable in the target environment comprises determining whether a user has a permission to redeploy or roll back a deployment of the list of previous deployments in the target environment.

6. The computer-implemented method of claim 1, further comprising:
  upon determining that the particular previous deployment is not redeployable in the target environment, communicating an error message to the client device for displaying on the client device.

7. The computer-implemented method of claim 1, further comprising:
  receiving a request for tracking information from the client device, the request for tracking information including an identifier of a deployment pipeline;
  retrieving a list of source code deployments for the deployment pipeline from a deployment database based on the identifier of the deployment pipeline; and
  forwarding the retrieved list of source code deployments for the deployment pipeline to the client device for display in a deployment pipeline user interface on the client device.

8. A computer system comprising:
  a processor;
  non-transitory memory, the non-transitory memory comprising instructions, which when executed by the processor cause the computer system to:
    receive, from a client device, a request to display a deployment history of a target environment;

in response to the request, obtain a list of a previous deployments associated with a repository identified in the request;

analyze the list of previous deployments to identify a subset of previous deployments that is redeployable in the target environment;

cause display of at least a portion of the subset of previous deployments that is redeployable on a display of the client device;

in response to a user selection of a displayed element associated with a particular previous deployment that is redeployable in the target environment, cause display of a preview user interface on the client device, the preview user interface including a listing of one or more items to be reverted in response to rolling back to the particular previous deployment; and in response to a user selection of a selectable affordance displayed on the client device, cause a roll back of a current code deployment to the particular previous deployment in the target environment.

9. The computer system of claim 8, wherein the list of one or more items to be reverted in response to rolling back to the particular previous deployment in the target environment comprises one or more issues associated with rolling back from the current code deployment in the target environment to the particular previous deployment in the target environment.

10. The computer system of claim 8, wherein the one or more issues associated with rolling back from the current code deployment in the target environment to the particular previous deployment in the target environment are identified based on a list of source code revisions between one or more source code revision identifiers associated with the particular previous deployment in the target environment and one or more source code revision identifiers associated with the current code deployment in the target environment.

11. The computer system of claim 8, wherein to analyze the list of previous deployments to identify the subset of previous deployments that is redeployable in the target environment, the non-transitory memory further comprising instructions, which when executed by the processor cause the processor to:

determine whether an artifact corresponding to a deployment of the list of previous deployments that has been successfully deployed in the target environment is available.

12. The computer system of claim 8, wherein to analyze the list of previous deployments to identify the subset of previous deployments that is redeployable in the target environment, the non-transitory memory further comprising instructions, which when executed by the processor cause the processor to:

determine whether a user has a permission to redeploy or roll back a deployment of the list of previous deployments in the target environment.

13. The computer system of claim 8, wherein the non-transitory memory further comprising instructions, which when executed by the processor cause the processor to:

upon determining that the particular previous deployment is not redeployable in the target environment, communicate an error message to the client device for displaying on the client device.

14. The computer system of claim 8, wherein the non-transitory memory further comprising instructions, which when executed by the processor cause the processor to:

receive a request for tracking information from the client device, the request for tracking information including an identifier of a deployment pipeline;

retrieve a list of source code deployments for the deployment pipeline from a deployment database based on the identifier of the deployment pipeline; and forward the retrieved list of source code deployments for the deployment pipeline to the client device for display in a deployment pipeline user interface on the client device.

15. A non-transitory computer-readable media (CRM) comprising instructions, which when executed by a processor of a computing device, causes the computing device to perform operations comprising:

receiving, from a client device, a request to display a deployment history of a target environment;

in response to the request, obtaining a list of a previous deployments associated with a repository identified in the request;

analyzing the list of previous deployments to identify a subset of previous deployments that is redeployable in the target environment;

causing display of at least a portion of the subset of previous deployments that is redeployable on a display of the client device;

in response to a user selection of a displayed element associated with a particular previous deployment that is redeployable in the target environment, causing display of a preview user interface on the client device, the preview user interface including a listing of one or more items to be reverted in response to rolling back to the particular previous deployment; and in response to a user selection of a selectable affordance displayed on the client device, causing a roll back of a current code deployment to the particular previous deployment in the target environment.

16. The non-transitory CRM of claim 15, wherein the list of one or more items to be reverted in response to rolling back to the particular previous deployment in the target environment comprises one or more issues associated with rolling back from the current code deployment in the target environment to the particular previous deployment in the target environment.

17. The non-transitory CRM of claim 16, wherein the one or more issues associated with rolling back from the current code deployment in the target environment to the particular previous deployment in the target environment are identified based on a list of source code revisions between one or more source code revision identifiers associated with the particular previous deployment in the target environment and one or more source code revision identifiers associated with the current code deployment in the target environment.

18. The non-transitory CRM of claim 15, wherein for analyzing the list of previous deployments to identify the subset of previous deployments that is redeployable in the target environment, the operations further comprise:

determining whether a user has a permission to redeploy or roll back a deployment of the list of previous deployments in the target environment; and determining whether an artifact corresponding to a deployment of the list of previous deployments that has been successfully deployed in the target environment is available.

19. The non-transitory CRM of claim 15, wherein the operations further comprise:

upon determining that the particular previous deployment is not redeployable in the target environment, communicating an error message to the client device for displaying on the client device.

20. The non-transitory CRM of claim 15, wherein the operations further comprise:
receiving a request for tracking information from the client device, the request for tracking information including an identifier of a deployment pipeline;
retrieving a list of source code deployments for the deployment pipeline from a deployment database based on the identifier of the deployment pipeline; and
forwarding the retrieved list of source code deployments for the deployment pipeline to the client device for display in a deployment pipeline user interface on the client device.

* * * * *